US 9,821,597 B2

(12) United States Patent
Koshiyama et al.

(10) Patent No.: US 9,821,597 B2
(45) Date of Patent: Nov. 21, 2017

(54) FORCE DISTRIBUTING APPARATUS HAVING FIRST AND SECOND PORTIONS FOR A BICYCLE WHEEL SPOKE

(71) Applicant: Shimano, Inc., Sakai-ku, Sakai, Osaka (JP)

(72) Inventors: Kazuki Koshiyama, Izumiotsu (JP); Hiroshi Fujita, Matsubara (JP)

(73) Assignee: Shimano, Inc., Sakai, Osaka (JP)

(*) Notice: Subject to any disclaimer, the term of this patent is extended or adjusted under 35 U.S.C. 154(b) by 0 days.

(21) Appl. No.: 15/362,065

(22) Filed: Nov. 28, 2016

(65) Prior Publication Data

US 2017/0072739 A1    Mar. 16, 2017

Related U.S. Application Data

(60) Division of application No. 13/654,719, filed on Oct. 18, 2012, now Pat. No. 9,561,685, which is a continuation-in-part of application No. 13/369,489, filed on Feb. 9, 2012, now abandoned.

(51) Int. Cl.
*B60B 1/04* (2006.01)
*B60B 27/02* (2006.01)

(52) U.S. Cl.
CPC .............. *B60B 1/042* (2013.01); *B60B 1/04* (2013.01); *B60B 1/041* (2013.01); *B60B 27/023* (2013.01)

(58) Field of Classification Search
CPC ....... B60B 1/042; B60B 1/041; B60B 27/023; B60B 1/04
USPC ................................ 301/55, 56, 59, 61, 104
See application file for complete search history.

(56) References Cited

U.S. PATENT DOCUMENTS

| 502,500 | A |   | 8/1893  | Perkins |
|---|---|---|---|---|
| 748,684 | A |   | 1/1904  | Andersen et al. |
| 5,795,036 | A | * | 8/1998  | Campagnolo ......... B60B 1/0261 301/59 |
| 6,409,278 | B1 | * | 6/2002  | Nakajima ............. B60B 1/0223 301/110.5 |
| 7,137,671 | B2 |   | 11/2006 | Passarotto et al. |

(Continued)

FOREIGN PATENT DOCUMENTS

| DE | 20313846 U1 | 1/2004 |
|---|---|---|
| DE | 60101980 T2 | 1/2005 |

(Continued)

OTHER PUBLICATIONS

Chinese search report from an office action dated Jul. 29, 2015, for CN 201210530850.3, the Chinese application that corresponds to the parent of this application.

(Continued)

*Primary Examiner* — S. Joseph Morano
*Assistant Examiner* — Jean Charleston
(74) *Attorney, Agent, or Firm* — James A. Deland

(57) ABSTRACT

A force-distributing apparatus for a bicycle wheel spoke attachment element includes a force-distributing body having a free-end first surface and a second surface disposed at an opposite side of the first surface. The first surface is disposed on a first portion of the force-distributing body, the second surface is disposed on a second portion of the force-distributing body, and the first surface may have the shape of a truncated sphere. The force-distributing body includes a spoke-receiving opening that extends into the first portion to form a spoke-receiving axis.

18 Claims, 11 Drawing Sheets

(56) References Cited

U.S. PATENT DOCUMENTS

| | | | |
|---|---|---|---|
| 7,748,790 B2* | 7/2010 | Meggiolan | B60B 1/041 29/894.33 |
| 7,967,392 B2* | 6/2011 | Meggiolan | B60B 1/0261 301/104 |
| 2001/0054840 A1* | 12/2001 | Schlanger | B60B 1/003 301/59 |
| 2005/0161997 A1* | 7/2005 | Passarotto | B60B 1/041 301/58 |
| 2007/0090686 A1 | 4/2007 | Okajima et al. | |
| 2008/0088175 A1 | 4/2008 | Hermansen et al. | |
| 2008/0284237 A1* | 11/2008 | Tsai | B60B 1/0261 301/58 |
| 2009/0058179 A1* | 3/2009 | Addink | B60B 1/0261 301/58 |
| 2013/0300186 A1* | 11/2013 | Schlanger | B60B 1/043 301/58 |

FOREIGN PATENT DOCUMENTS

| | | |
|---|---|---|
| EP | 0860301 A1 | 8/1998 |
| EP | 1209006 A1 | 5/2002 |
| GB | 2479870 A | 11/2011 |
| JP | 3155204 U | 10/2009 |
| JP | 201117352 A | 1/2011 |
| TW | 511588 U | 11/2002 |
| TW | 200628330 A | 1/2006 |
| WO | 0006319 A1 | 2/2000 |
| WO | 2005023563 A1 | 3/2005 |
| WO | 2006070415 A1 | 7/2006 |

OTHER PUBLICATIONS

Taiwanese search report from an office action dated on or about Aug. 6, 2015 for TW 101141190, The Taiwanese application that corresponds to the parent of this application.

* cited by examiner

FORCE DISTRIBUTING APPARATUS HAVING FIRST AND SECOND PORTIONS FOR A BICYCLE WHEEL SPOKE

CROSS REFERENCE TO RELATED APPLICATIONS

This application is a division of U.S. patent application Ser. No. 13/654,719 filed Oct. 18, 2012 and titled "Force Distributing Apparatus for a Bicycle Wheel Spoke," which is a continuation-in-part of U.S. patent application Ser. No. 13/369,489 filed Feb. 9, 2012 and titled "Force Distributing Apparatus for a Bicycle Wheel Spoke."

BACKGROUND OF THE INVENTION

The present invention is directed to bicycle wheels and, more particularly, to a force-distributing apparatus for a bicycle wheel spoke.

A typical bicycle wheel comprises a hub that is rotatably mounted around a hub shaft, an annular rim structured to support a tire, and a plurality of spokes that connect the hub to the rim. The hub typically includes a pair of spaced-apart hub flanges, wherein each hub flange includes a plurality of circumferentially-disposed openings. The wheel rim also includes a plurality of circumferentially-disposed openings. Each spoke typically has an enlarged head at one end and a threaded shaft at the other end. The spoke extends through a corresponding opening in one of the hub flanges and through a corresponding opening in the wheel rim until the head abuts against the hub flange. The spoke is fastened to the wheel rim by a threaded nut that is screwed onto the threaded shaft and abuts against the wheel rim.

SUMMARY OF THE INVENTION

The present invention is directed to various features of a force-distributing apparatus for a bicycle wheel spoke. In one embodiment, a force-distributing apparatus for a bicycle wheel spoke comprises a force-distributing body having a free-end first surface and a second surface disposed at an opposite side of the first surface. The first surface is disposed on a first portion of the force-distributing body, the second surface is disposed on a second portion of the force-distributing body, and the first surface has the shape of a truncated sphere. The force-distributing body includes a spoke-receiving opening that extends into the first portion to form a spoke-receiving axis.

In another embodiment, force distributing apparatus is provided for a bicycle wheel spoke, wherein the spoke is structured to be mounted to a hub flange of a bicycle wheel hub, and wherein the hub flange includes an opening with a flange-opening axis. The apparatus comprises a force-distributing body including a free-end first surface disposed on a first portion of the force-distributing body, a second surface disposed at an opposite side of the first surface on a second portion of the force-distributing body, and a spoke-receiving opening that extends into the first portion to form a spoke-receiving axis. The first surface of the force-distributing body is structured to engage the hub flange when the spoke is mounted to the hub flange, and at least one of the first surface or the second surface is shaped to allow the spoke to move in any lateral direction relative to the flange-opening axis.

Additional inventive features will become apparent from the description below, and such features alone or in combination with the above features and their equivalents may form the basis of further inventions as recited in the claims.

DETAILED DESCRIPTION OF THE EMBODIMENTS

Figure 1:
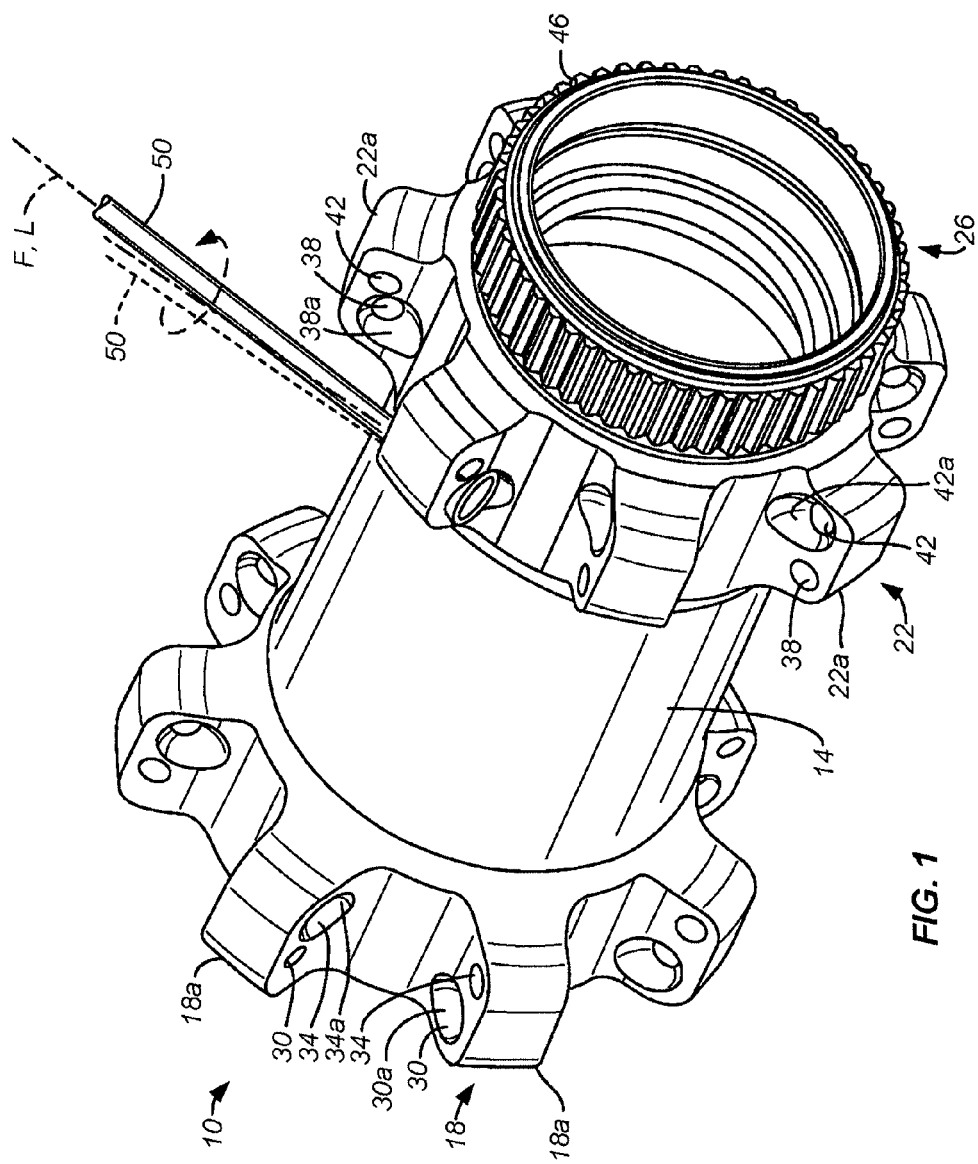
FIG. 1 is a perspective view of a particular embodiment of a bicycle wheel hub with a spoke and a force-distributing apparatus mounted to a hub flange in a rest position.

FIG. 1 is a perspective view of a bicycle wheel hub 10 that comprises a hollow hub body 14, a first hub flange unit 18, a second hub flange unit 22, and a brake rotor fixing unit 26. First hub flange unit 18 includes a plurality of circumferentially-disposed and radially-extending hub flanges 18a, each of which has a first spoke-mounting opening 30 and a second spoke-mounting opening 34. Each first spoke-mounting opening 30 includes a clockwise-facing contact surface 30a, and each second spoke-mounting opening 34 includes a counterclockwise-facing contact surface 34a. Similarly, second hub flange unit 22 includes a plurality of circumferentially-disposed and radially-extending hub flanges 22a, each of which has a first spoke-mounting opening 38 and a second spoke-mounting opening 42. Each first spoke-mounting opening 38 includes a counterclockwise-facing contact surface 38a, and each second spoke-mounting opening 42 includes a clockwise-facing contact surface 42a. Brake rotor fixing unit 26 comprises a plurality of circumferentially-disposed splines 46 that are used to mount a conventional disk brake rotor.

Figure 2:
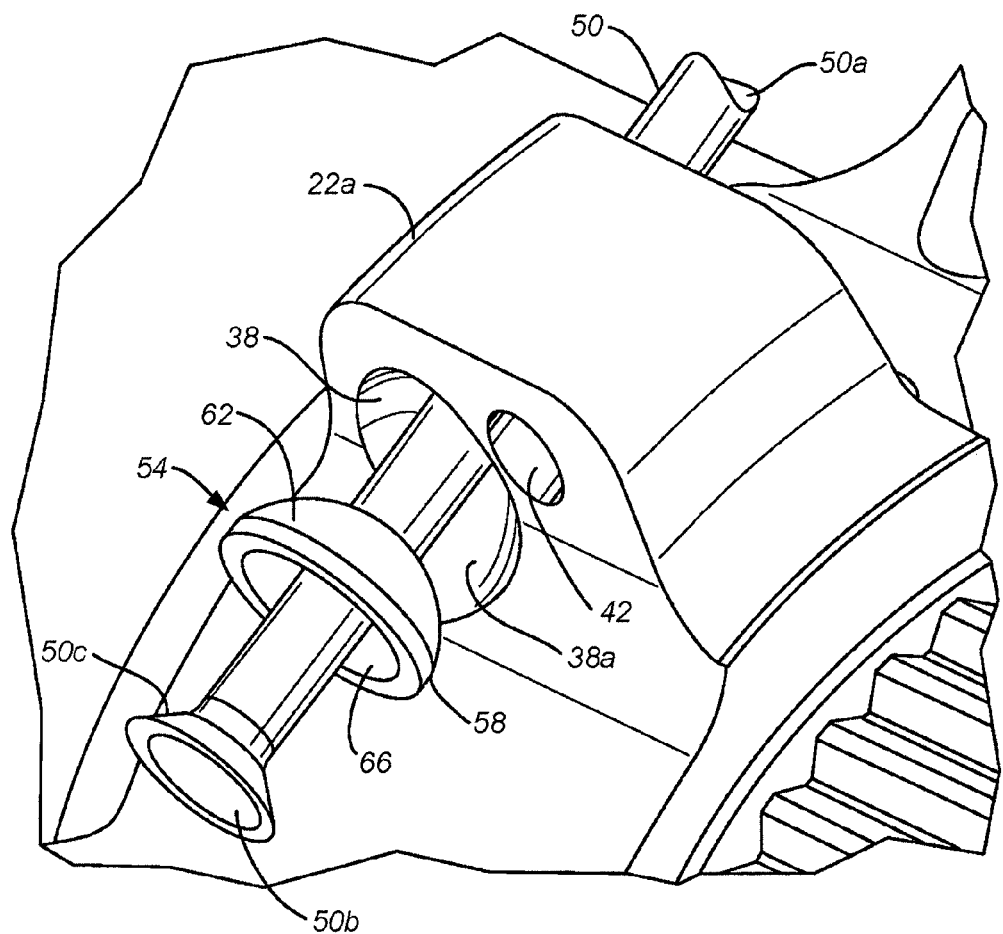
FIG. 2 is a more detailed perspective view showing the relationship of the hub flange, the spoke, and the force-distributing apparatus.

FIG. 1 shows a spoke 50 mounted to hub flange 22 in a rest position. As shown in FIG. 2, spoke 50 includes an elongated spoke body 50a and a spoke attachment element in the form of a spoke head 50b, wherein spoke body 50a extends through first opening 38 in hub flange 22a. In this embodiment, spoke head 50b includes a contact surface 50c in the form of a frustum of a hemisphere. A force-distributing apparatus in the form of a force-distributing member 54 is disposed between contact surface 38a of hub flange 22a and contact surface 50c of spoke 50.

Figure 3A:
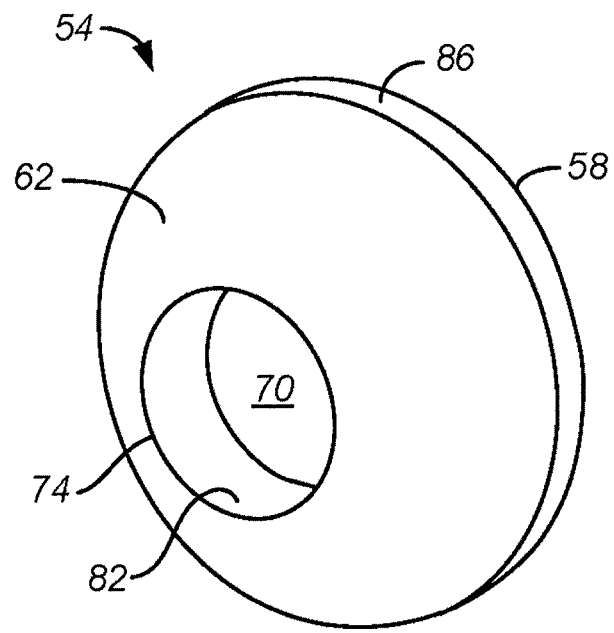
FIG. 3A is a front perspective view of the force-distributing apparatus.
Figure 3B:
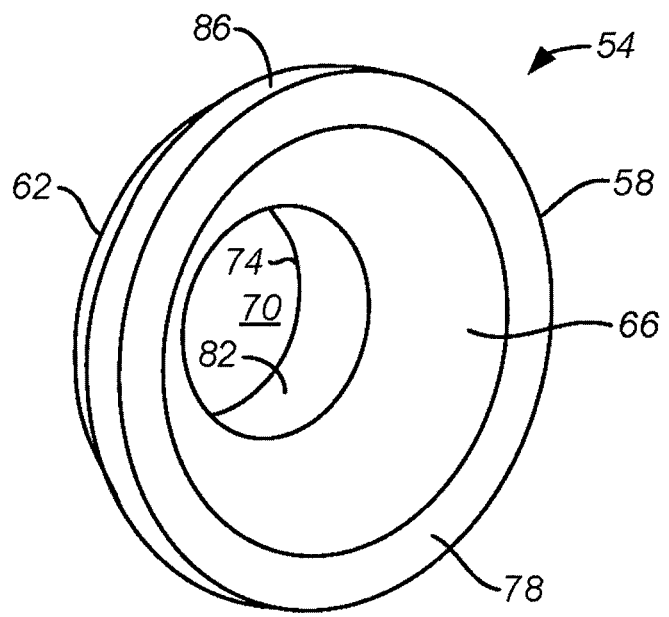
FIG. 3B is a rear perspective view of the force-distributing apparatus.

As shown in FIGS. 3a and 3b, force-distributing member 54 includes a force-distributing body 58 that has the shape of a truncated sphere. As used herein, the phrase "shape of a truncated sphere" applies to "generally has the shape of a truncated sphere," such as generally the shape of a hemisphere, such as generally the shape of a frustum of a sphere, such as generally the shape of a frustum of a hemisphere, such as generally the shape of a frustum of a hollow hemisphere, and optionally a true frustum of a hollow hemisphere. The word "sphere," applied to a hollow or solid, convex or concave object, has the ordinary definition of a three-dimensional surface, all points of which are substantially equidistant from a fixed point. The word "truncated" in the context of a geometrical object has the ordinary meaning of having the apex cut off, preferably but not necessarily by a plane.

Force-distributing body 58 has a convex free-end first surface 62, a concave second surface 66 disposed at an opposite side of first surface 62, and a centrally-disposed spoke-receiving opening 70 that extends through first surface 62 and second surface 66. A circular front edge 74 is formed at the junction of first surface 62 and spoke-receiving opening 70, and an annular, planar rear edge 78 is formed at the rear of force-distributing body 58. A cylindrical inner transition surface 82 is formed between front edge 74 and second surface 66, and a cylindrical outer transition surface 86 is formed between first surface 62 and rear edge 78. As a result of the foregoing structures, first surface 62 and second surface 66 each generally has the shape of a truncated sphere, such as generally the shape of a hemisphere, such as generally the shape of a frustum of a sphere, such as generally the shape of a frustum of a hemisphere, and optionally a true frustum of a hemisphere.

As shown in FIGS. 1 and 2, first surface 62 of force-distributing member 54 is structured to engage contact surface 38a of first spoke-mounting opening 38 in hub flange 22a, and second surface 66 of force-distributing member 54 is structured to engage contact surface 50c of spoke head 50b. The same is true when spokes 50 are mounted in openings 30 and 34 in hub flanges 18a and in the other openings 38 and 42 in hub flanges 22a. The portion of each contact surface 30a, 34a, 38a and 42a that engages first surface 62 of a corresponding force-distributing member 54 generally has the shape of a truncated sphere, such as generally the shape of a hemisphere, such as generally the shape of a frustum of a sphere, such as generally the shape of a frustum of a hemisphere, and optionally a true frustum of a hemisphere.

When spoke 50 is mounted to hub flange 22a in the rest position shown in FIG. 1, spoke 50 defines a longitudinal rest-position axis L that aligns with a flange-opening axis F. Contact surface 38a of first spoke-mounting opening 38 and first surface 62 of force-distributing member 54 form a ball joint when spoke 50 is mounted to hub flange 22a. As a result, spoke 50 can be mounted at any angle relative to hub flange 22a. Furthermore, spoke 50 can gyrate or otherwise move in any direction relative to axes F and L as shown by broken lines in FIG. 1. In this embodiment, contact surface 50c of spoke head 50a and second surface 66 of force-distributing member 54 also form a ball joint when spoke 50 is mounted to hub flange 22a so that spoke 50 can gyrate or otherwise move in any direction relative to axes F and L. The same is true when spokes 50 are mounted in openings 30 and 34 in hub flanges 18a and in the other openings 38 and 42 in hub flanges 22a. As a result, hub flanges 18a and 22a can accommodate any motion of spokes 50 caused by lateral forces applied to the wheel rim, thereby avoiding undesirable stresses to spokes 50 during operation of the bicycle.

Figure 4:
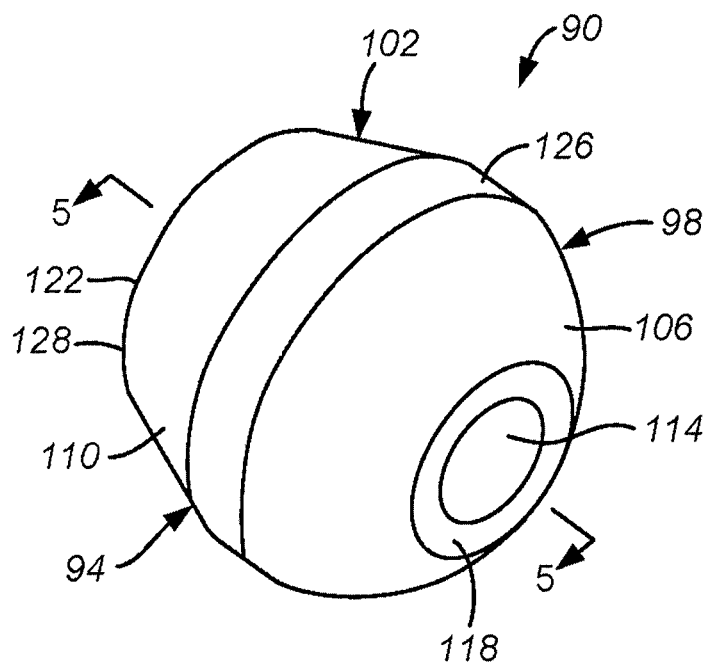
FIG. 4 is a perspective view of another embodiment of a force-distributing apparatus.
Figure 5:
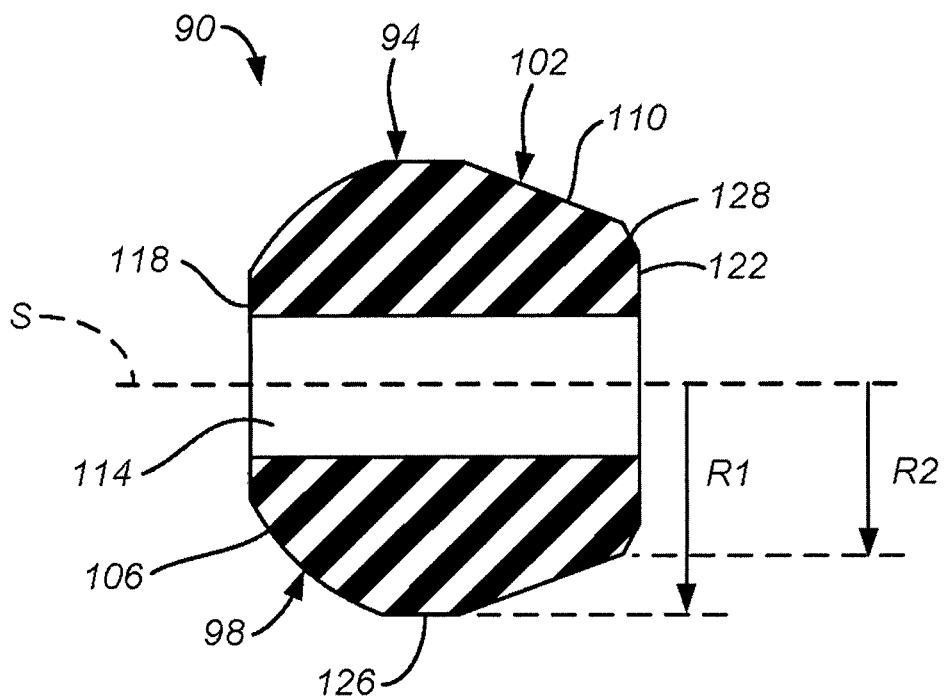
FIG. 5 is a view taken along line 5-5 in FIG. 4.

FIG. 4 is a perspective view of another embodiment of a force-distributing apparatus in the form of a force-distributing member 90, and FIG. 5 is a cross-sectional view taken along line 5-5 in FIG. 4. In this embodiment, force-distributing member 90 comprises a force-distributing body 94 including a first portion 98 and a second portion 102. A convex first surface 106 is disposed on first portion 98, a second surface 110 is disposed on second portion 102, and a spoke-receiving opening 114 extends through first portion 98 and second portion 102 to form a spoke-receiving axis S (FIG. 5). An annular, planar front edge 118 is formed at the front of force-distributing body 94, and an annular, planar rear edge 122 is formed at the rear of force-distributing body 94. A generally cylindrical outer transition surface 126 is formed between first surface 106 and second surface 110, and an annular beveled surface 128 is formed between second surface 110 and rear edge 122. Second surface 110 is tapered relative to spoke-receiving axis S so that a radius R1 of second surface 110 at outer transition surface 126 is greater than a radius R2 of second surface 110 at beveled surface 128. In this embodiment, first surface 106 generally has the shape of a truncated sphere, such as generally the shape of a hemisphere, such as generally the shape of a frustum of a sphere, such as generally the shape of a frustum of a hemisphere, and optionally a true frustum of a hemisphere. Second surface 110 generally has a conical shape, such as generally the shape of a truncated cone, such as generally the shape of a frustum of a cone, and optionally a true frustum of a cone.

Figure 6:
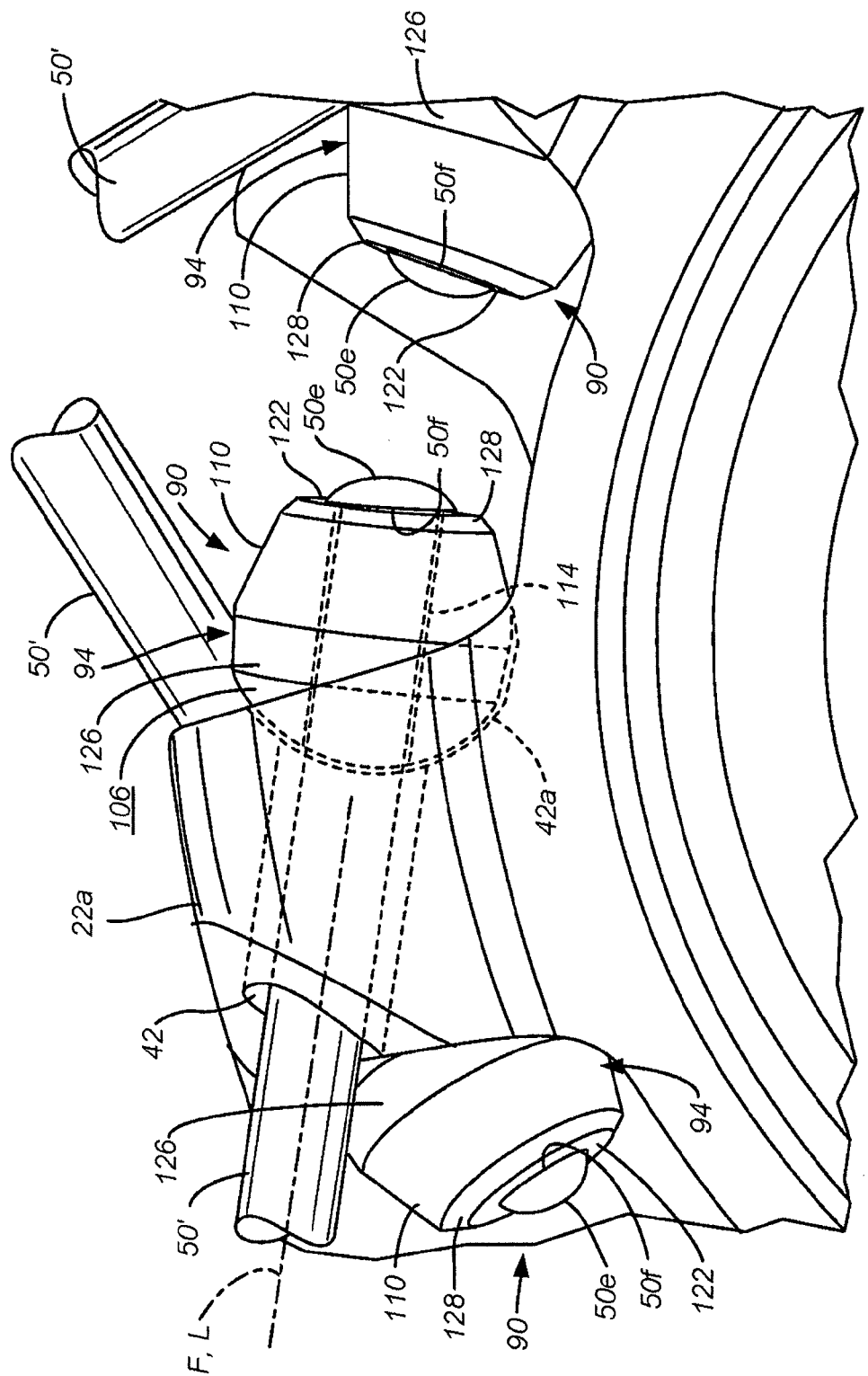
FIG. 6 is a side view showing a plurality of spokes mounted to a hub flange of the bicycle wheel hub using the alternative force-distributing apparatus shown in FIGS. 4 and 5.

FIG. 6 is a side view showing a plurality of modified spokes 50' mounted to hub flange 22a, for example, using force-distributing member 90. Each spoke 50' has a modified spoke head 50e in the form of a hemisphere with a flat annular surface 50f that contacts rear edge 122 of a corresponding force-distributing member 90 when spoke 50' is mounted to flange 22a.

Hub flanges 18a and 22a have the same structure as in the first embodiment. Thus, as shown in FIG. 6, as in the first embodiment, first surface 106 of each force-distributing member 90 is structured to engage a corresponding contact surface (e.g., contact surface 42a) of a spoke-mounting opening (e.g., second spoke-mounting opening 42). First surface 106 of force-distributing member 90 and contact surface 42a of second spoke-mounting opening 42 form a ball joint when spoke 50' is mounted to hub flange 22a. As a result, as in the first embodiment, spoke 50' can be mounted at any angle relative to hub flange 22a, and spoke 50' can gyrate or otherwise move in any direction relative to axes F and L in response to lateral forces applied to the bicycle wheel.

Figure 7A:
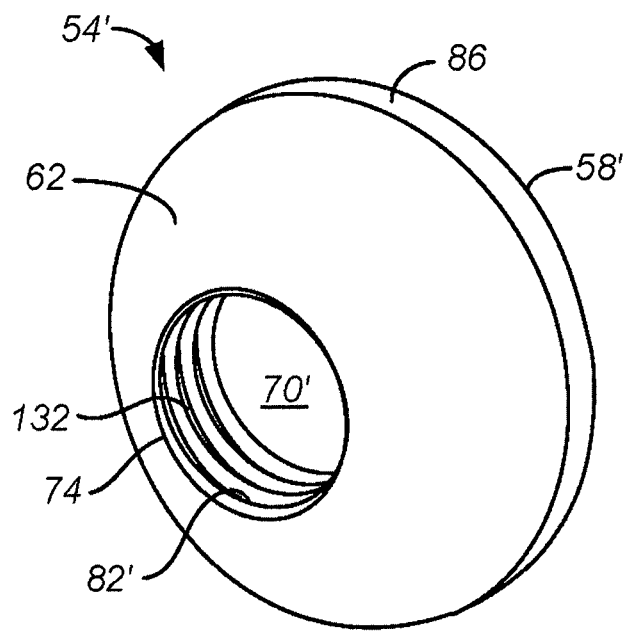
FIG. 7A is a front perspective view of an alternative embodiment of a force-distributing apparatus.
Figure 7B:
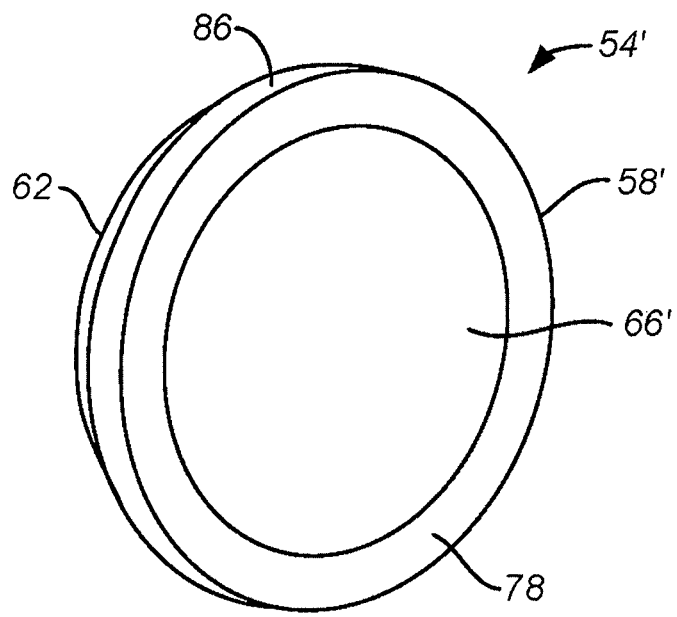
FIG. 7B is a rear perspective view of another alternative embodiment of a force-distributing apparatus.

While the above is a description of various embodiments of inventive features, further modifications may be employed without departing from the spirit and scope of the present invention. For example, while inner transition surface 82 in the first embodiment was smooth, FIG. 7A shows an embodiment wherein an inner transition surface 82' a force-distributing body 58' of a force-distributing member 54' forms, at least in part, a threaded inner peripheral surface 132 to form a threaded opening 70' so that a threaded end of a spoke can be screwed directly into force-distributing body 58'. If desired, as shown in FIG. 7B, a modified second surface 66' may partially or completely close off the rear of spoke-receiving opening 70. FIG. 7B shows second surface 66' completely closing off the rear of spoke receiving opening 70 so that spoke receiving opening 70 is a blind opening, preferably with the threaded inner transition surface 82' shown in FIG. 7A.

Figure 8:
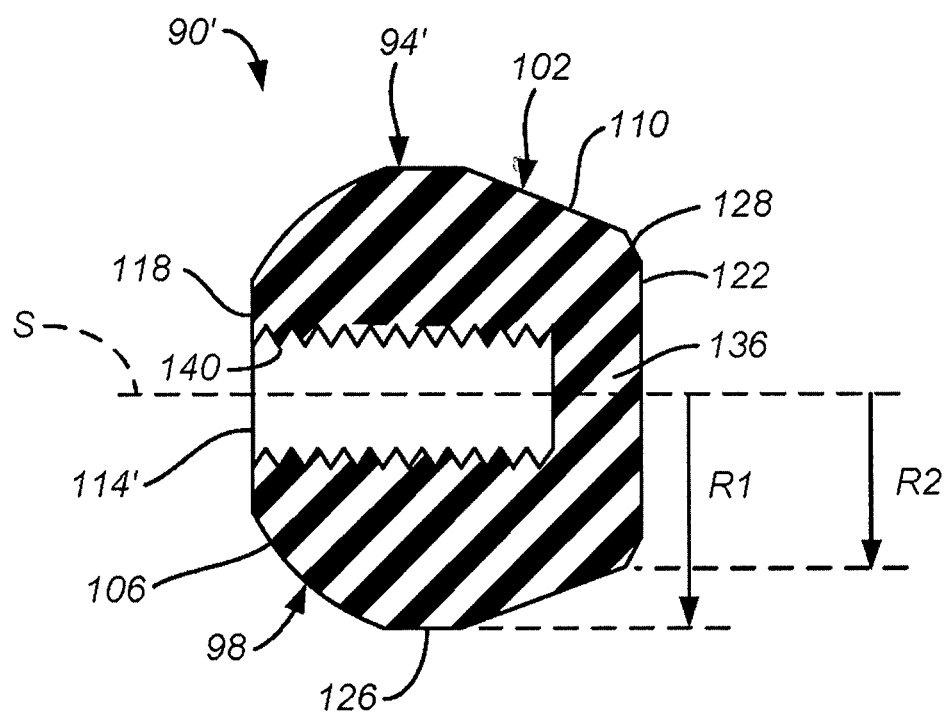
FIG. 8 is a cross-sectional view, similar to FIG. 5, of another alternative embodiment of a force-distributing apparatus.

While spoke-receiving opening 114 in the second embodiment extended through both front edge 118 and rear edge 122 of force-distributing body 94 as shown in FIG. 5, FIG. 8 shows an embodiment of a force-distributing body 94' wherein a rear wall 136 partially or completely closes off the rear of a spoke-receiving opening 114'. FIG. 8 shows rear wall 136 completely closing off the rear of spoke-receiving opening 114' so that spoke-receiving opening 114' is a blind opening. A threaded inner peripheral surface 140 is formed, at least in part, around spoke-receiving opening 114' so that a threaded end of a spoke can be screwed directly into force-distributing body 94'.

Figure 9:
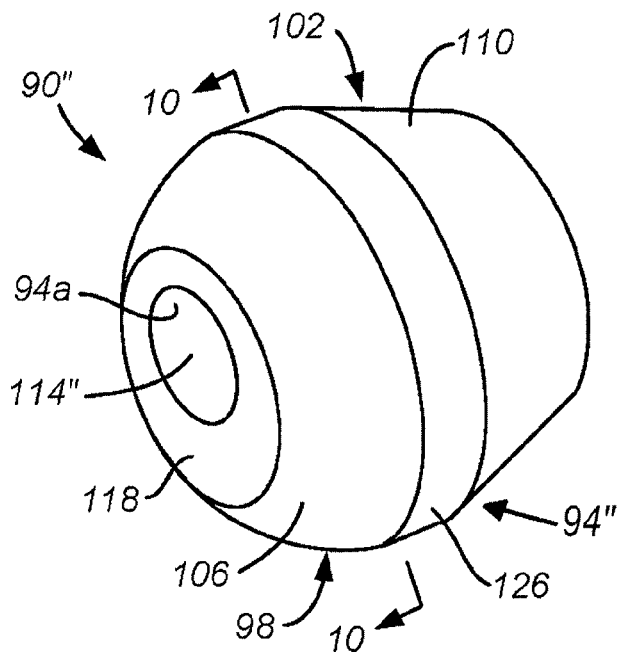
FIG. 9 is a perspective view of another embodiment of a force-distributing apparatus.
Figure 10:
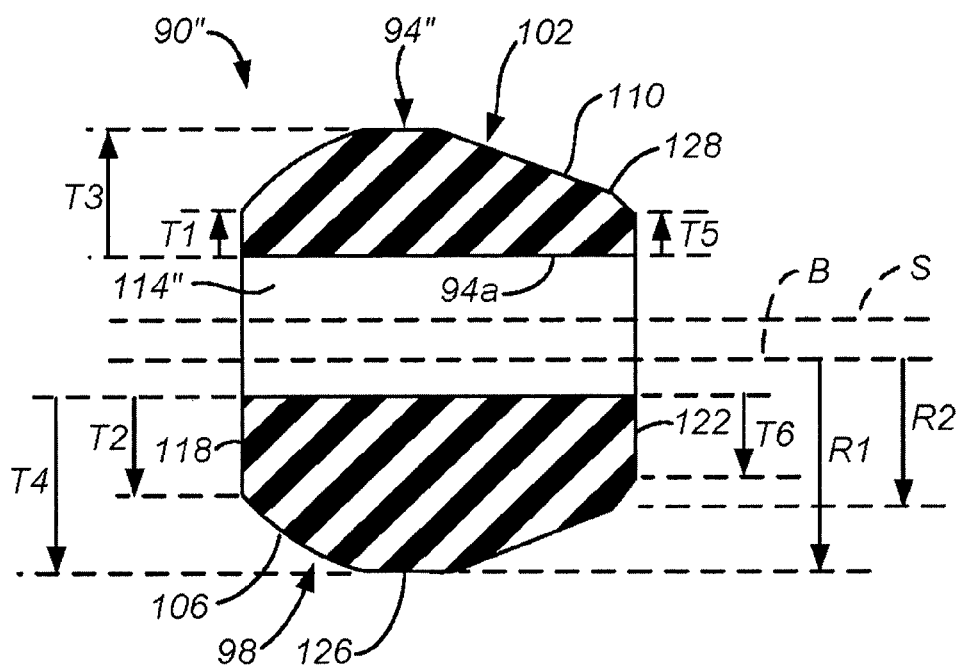
FIG. 10 is a view taken along line 10-10 in FIG. 9.

While the spoke-receiving opening in each of the above embodiments was formed concentrically in the force-distributing member, additional benefits can be obtained by forming the spoke-receiving opening eccentrically in the force-distributing member. For example, FIGS. 9-10 illustrate another embodiment of a force-distributing member 90" similar to force-distributing member 90 in FIGS. 4-5. The parts of force-distributing member 90" that are the same as force distributing member 90 are numbered the same. In this embodiment, a spoke-receiving opening 114" is formed eccentrically within a force-distributing body 94" of force-distributing member 90".

Figure 11:
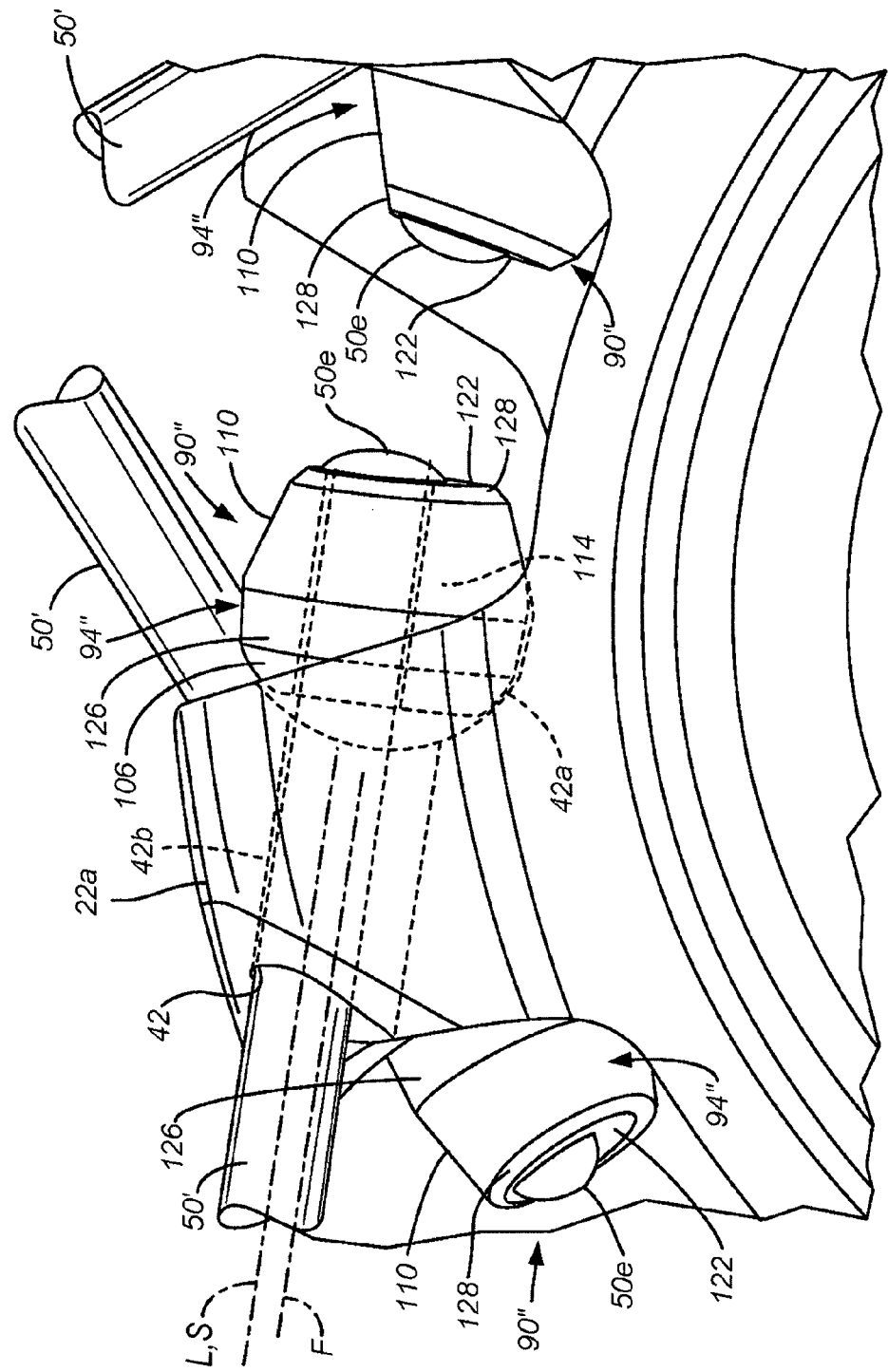
FIG. 11 is a side view showing a plurality of spokes mounted to a hub flange of the bicycle wheel hub using the alternative force-distributing apparatus shown in FIGS. 9 and 10.

More specifically, as shown in FIG. 10, an unthreaded spoke receiving opening 114" is formed by an inner peripheral surface 94a of force-distributing body 94" and defines a spoke-receiving-axis S that is offset from but parallel to a force-distributing-body axis B that is concentric with force-distributing body 94". As a result, a thickness T1 of the upper portion of force-distributing body 94" at front edge 118 is less than a thickness T2 of the lower portion of force-distributing body 94" at front edge 118, a thickness T3 of the upper portion of force-distributing body 94" at outer transition surface 126 is less than a thickness T4 of the lower portion of force-distributing body 94" at outer transition surface 126, and a thickness T5 of the upper portion of force-distributing body 94" at rear edge 122 is less than a thickness T6 of the lower portion of force-distributing body 94" at rear edge 122. Second surface 110 is tapered relative to force-distributing-body axis B so that a radius R1 of second surface 110 at outer transition surface 126 is greater than a radius R2 of second surface 110 at beveled surface 128. Thus, when force-distributing member 90" is mounted to a hub flange 22a with a spoke 50' as shown in FIG. 11, spoke 50' abuts against an inner peripheral surface 42b of a spoke-mounting flange 22, and rest-position axis L of spoke 50' is offset from flange-opening axis F. As a result, the lower portion of force-distributing body 94" presses against contact surface 42a of spoke-mounting opening 42, thereby creating a frictional force that inhibits force-distributing member 90" from rotating relative to contract surface 42a and preventing spoke 50' from unscrewing from the nut at the wheel rim.

Figure 12:
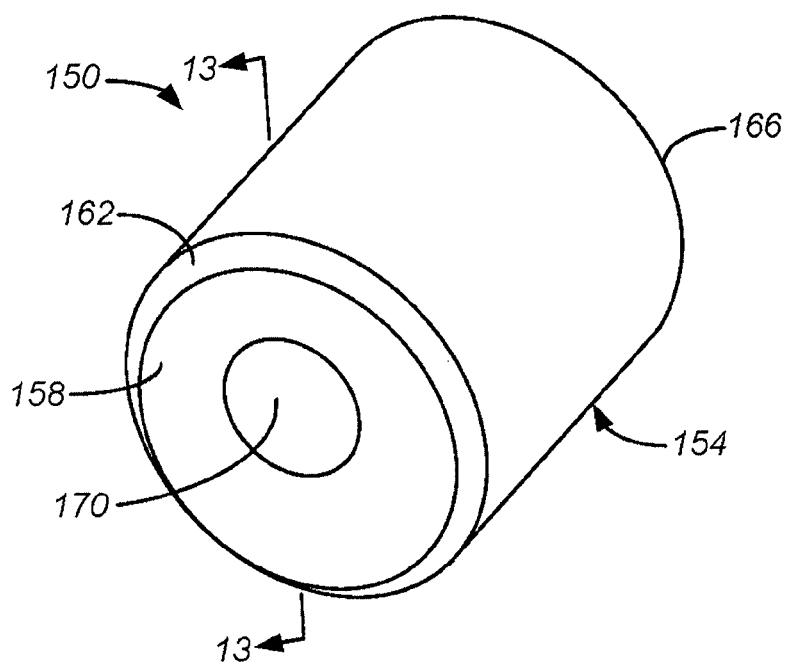
FIG. 12 is a perspective view of another embodiment of a force-distributing apparatus.
Figure 13:
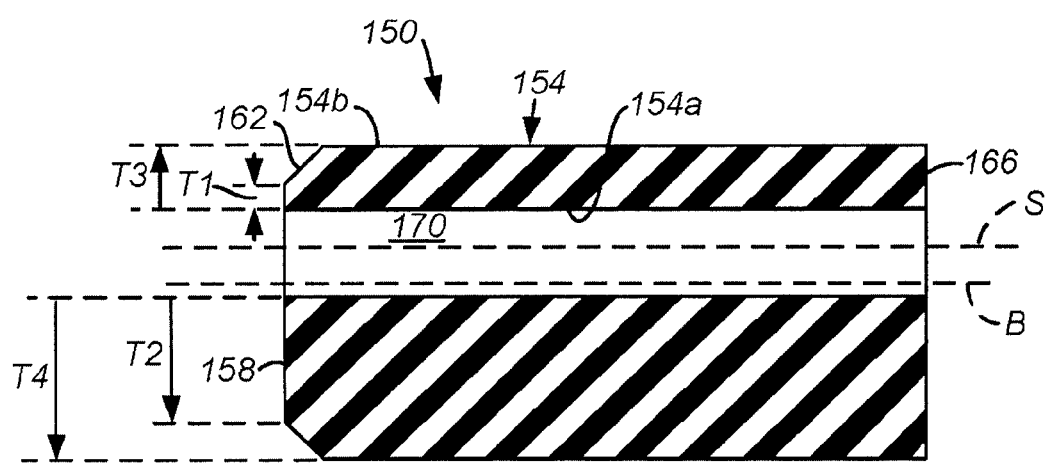
FIG. 13 is a view taken along line 13-13 in FIG. 12.

FIGS. 12-13 illustrate another embodiment of a force-distributing member 150. Force distributing member 150 comprises a generally cylindrically-shaped force-distributing body 154, an annular, planar front edge 158 with a beveled edge 162, an annular, planar rear edge 166, and an unthreaded spoke-receiving opening 170 that is formed eccentrically within force-distributing body 154.

Figure 14:
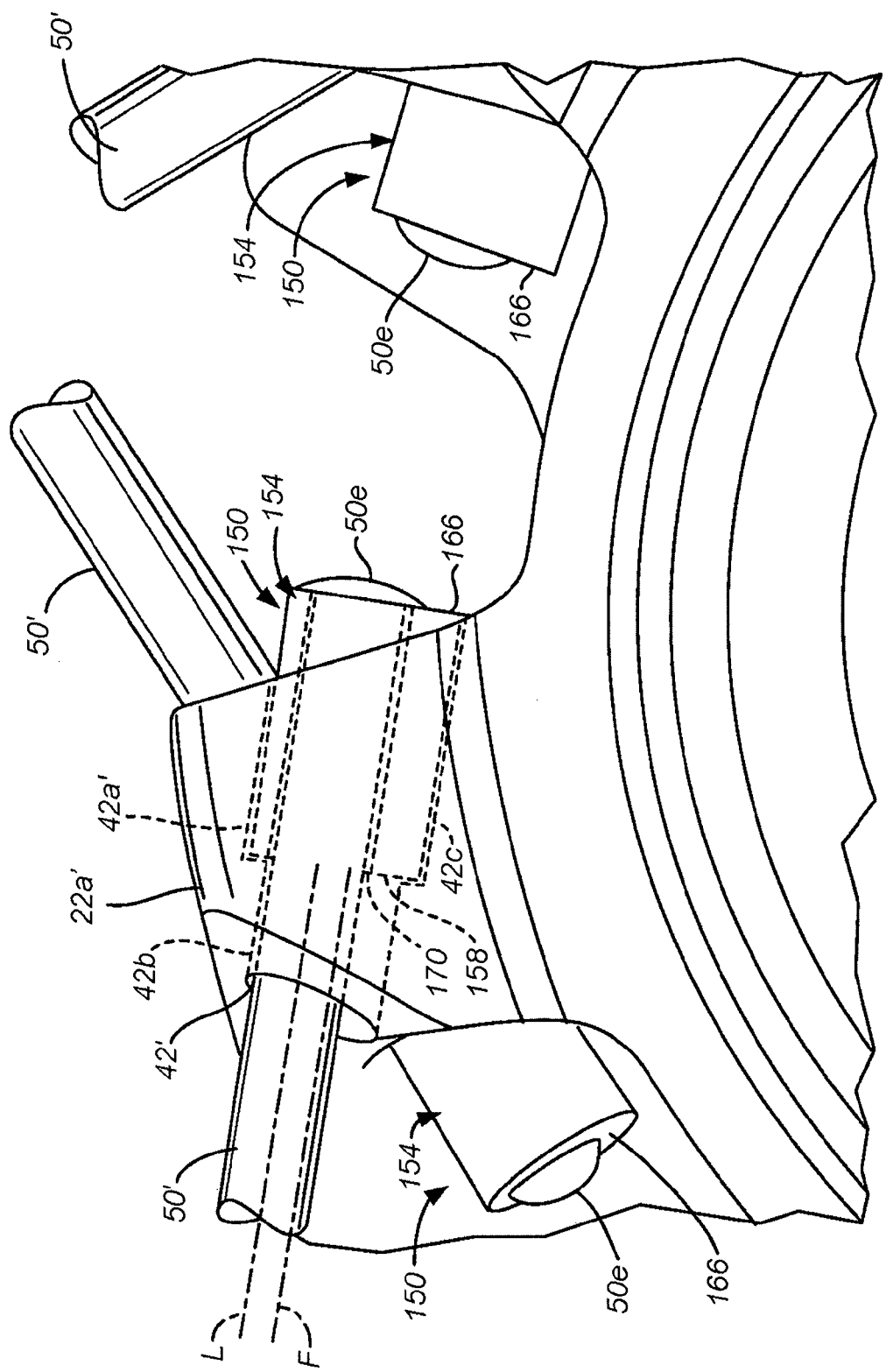
FIG. 14 is a side view showing a plurality of spokes mounted to a hub flange of the bicycle wheel hub using the alternative force-distributing apparatus shown in FIGS. 12 and 13.

As shown in FIG. 13, spoke receiving opening 170 is formed by an inner peripheral surface 154a of force-distributing body 154 and defines a spoke-receiving-axis S that is offset from but parallel to a force-distributing-body axis B that is concentric with force-distributing body 154. As a result, a thickness T1 of the upper portion of force-distributing body 154 at front edge 158 is less than a thickness T2 of the lower portion of force-distributing body 154 at front edge 158, and a thickness T3 of the upper portion of force-distributing body 154 at an outer peripheral surface 154b of force-distributing body 154 is less than a thickness T4 of the lower portion of force-distributing body 154 at outer peripheral surface 154b. Thus, as shown in FIG. 14, when force-distributing member 150 is mounted with a spoke 50' within a cylindrically-shaped bore 42a' of a modified spoke mounting opening 42' of a modified hub flange 22a', spoke 50' abuts against an inner peripheral surface 42b of spoke-mounting flange 22a', and rest-position axis L of spoke 50' is offset from flange-opening axis F. As a result, the lower portion of force-distributing body 154 presses against an inner peripheral surface 42c of cylindrically-shaped bore 42a', thereby creating a frictional force that prevents force-distributing member 154 from rotating relative to inner peripheral surface 42c and preventing spoke 50' from unscrewing from the nut at the wheel rim.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A force distributing apparatus for a bicycle wheel spoke, wherein the apparatus comprises:
 a force-distributing body having an external surface, wherein the external surface includes a free-end first surface and a second surface disposed at an opposite axial side of the first surface;
 wherein the first surface is disposed on a first portion of the force-distributing body;
 wherein the second surface is disposed on a second portion of the force-distributing body;
 wherein the first surface has the shape of a truncated sphere;

wherein the force-distributing body includes a spoke-receiving opening that extends into the first portion to form a spoke-receiving axis; and wherein the second surface is tapered relative to the spoke-receiving axis.

2. The apparatus according to claim 1 wherein the first surface has the shape of a frustum of a sphere.

3. The apparatus according to claim 1 wherein the second surface has a conical shape.

4. The apparatus according to claim 3 wherein the second surface has the shape of a truncated cone.

5. The apparatus according to claim 4 wherein the second surface has the shape of a frustum of a cone.

6. The apparatus according to claim 1 wherein the first surface has the shape of a frustum of a sphere, and wherein the second surface has the shape of a frustum of a cone.

7. The apparatus according to claim 1 wherein the spoke-receiving opening is a blind opening.

8. The apparatus according to claim 1 wherein the spoke-receiving opening extends completely through the force-distributing body.

9. A force distributing apparatus for a bicycle wheel spoke, wherein the spoke is structured to be mounted to a hub flange of a bicycle wheel hub, wherein the hub flange includes an opening with a flange-opening axis, and wherein the apparatus comprises:
 a force-distributing body having an external surface, wherein the external surface includes:
  a free-end first surface disposed on a first portion of the force-distributing body; and
  a second surface disposed at an opposite axial side of the first surface on a second portion of the force-distributing body;
 wherein the force-distributing body further includes a spoke-receiving opening that extends into the first portion to form a spoke-receiving axis;
 wherein the first surface is structured to engage the hub flange when the spoke is mounted to the hub flange;
 wherein the second surface is tapered relative to the spoke-receiving axis; and
 wherein at least one of the first surface or the second surface is shaped to allow the spoke to move in any lateral direction relative to the flange-opening axis.

10. The apparatus according to claim 9 wherein the first surface is shaped to allow the spoke to move in any lateral direction relative to the flange-opening axis when the spoke is mounted to the hub flange.

11. The apparatus according to claim 9 wherein the first surface has the shape of a truncated sphere.

12. The apparatus according to claim 11 wherein the first surface has the shape of a frustum of a sphere.

13. The apparatus according to claim 9 wherein the second surface has a conical shape.

14. The apparatus according to claim 13 wherein the second surface has a shape of a truncated cone.

15. The apparatus according to claim 14 wherein the second surface has a shape of a frustum of a cone.

16. The apparatus according to claim 9 wherein the first surface has the shape of a frustum of a sphere, and wherein the second surface has the shape of a frustum of a cone.

17. The apparatus according to claim 9 wherein the spoke-receiving opening is a blind opening.

18. The apparatus according to claim 9 wherein the spoke-receiving opening extends completely through the force-distributing body.

* * * * *